United States Patent Office 3,434,705
Patented Mar. 25, 1969

3,434,705
PNEUMATIC STEELMAKING PLANT
Carlo Pere, Genoa, Italy, assignors to Società Italiana
Impianti—Società per Azioni
Filed Jan. 24, 1966, Ser. No. 522,491
Claims priority, application Italy, June 15, 1965,
13,641/65; Sept. 6, 1965, 19,922/65
Int. Cl. C21c 5/28, 5/44, 7/00
U.S. Cl. 266—13                                 3 Claims

ABSTRACT OF THE DISCLOSURE

A plurality of converters arranged for movement in a continuous path along which various steelmaking stations are positioned. One station involves burning off excess carbon and the evolved hot carbon monoxide is passed to another station at which charging of cold scrap is effected, for preheating purposes.

---

This invention relates to pneumatic steelmaking plants, i.e., to steel works in which the steel is produced in converters in which air or oxygen is blown into a charge of molten cast-iron, usually with addition of iron scraps, so that excess carbon combines with the oxygen and the resulting melt is a carbon steel ready for being poured out of the converter.

In conventional steel-works of this kind all or substantially all of the operations of a cycle are effected in fixed converters, which remain always in the same position. These operations involve first charging the cold scrap into the converter and subsequently introducing the molten cast iron, whereafter air and/or oxygen is blown into said scrap and cast-iron until the cast-iron and scrap melt is transformed into molten steel. This steel is then poured into ladles while the slag formed together with the steel and floating thereon is poured into buckets. Thereafter, the converter is cleaned and prepared again for the successive cycle.

All these process steps are effected conventionally by the use of equipment arranged in proximity of the said fixed converter.

This renders the plant somewhat complicated and due to the converter being fixed, much time is lost between subsequent steps. These time losses greatly reduce the efficiency of the plant. Moreover, whenever it is required to restore the converter lining, the operation of the whole plant must be stopped for extended periods.

The invention aims to eliminate these and other drawbacks of the conventional pneumatic steelmaking plants and aims primarily to increase the plant efficiency by substantially reducing the dead times and eliminating the interference between the various steps of the cycle. Furthermore the invention aims to provide the replacement of one converter, when its lining is worn out, with another converter, while permitting the operation of the whole pneumatic plant, even during the restoring of the lining of the first converter.

The invention substantially consists in providing an improved pneumatic steelmaking plant in which the different operations of the cycle, such as the charging of the solid scrap and of the molten cast iron into the converter, the blowing of air and/or oxygen into the molten charge, the pouring of the steel and slag formed in said converter during the blowing, the cleaning of the converter mouth after said pouring and the restoring of the converter lining are executed separately in distinct stations arranged at least in part along a closed circuit around which a plurality of converters mounted upon wheeled trucks are adapted to move.

Another peculiar advantage of employing a plurality of converters traveling in a closed cycle consists in the possibility of providing a pre-heating of at least a part of the metallic charge in one of the converters in the cycle, in one of the stations preceding the blowing stations, by employing as fuel at least in part, the carbon monoxide gas evolved during the blowing at the said blowing station.

According to the invention, this pre-heating of the metallic charge in the converter may be effected either at the scrap-charging station, and/or in a particular pre-heating station, just before the liquid cast-iron charging station, and/or in a station between the cast-iron charging station and the blowing station.

The preheating of the metallic charge and particularly of the solid scrap charge within the converter shifts the thermic balance of the conventional process, by permitting to increase the percentage of the solid scrap charge, with respect to the total charge, by causing same to be increased from the actual value, which is comprised between 15 and 30%, up to values comprised between 30% and 50% and even more. The increase of the percentage of solid scrap charge permits, in its turn, to attain the following advantages: reduction of the carbon contents of the charge, reduction of the oxygen consumption by equal casting weight, sensible reduction of the blowing time, reduction of non-metallic additions; reduced amount of slag and better efficiency of the converter, in addition to the increase of the total production of the steelmaking plant, by equal amount of available liquid charge or reduction of the converter size by equal total production of the steelmaking plant.

The above and other characteristic features of the invention and the advantages deriving therefrom will be apparent from the following specification of a preferred embodiment, diagrammatically shown by way of non-limiting example in the accompanying drawings, in which.

Figure 1:
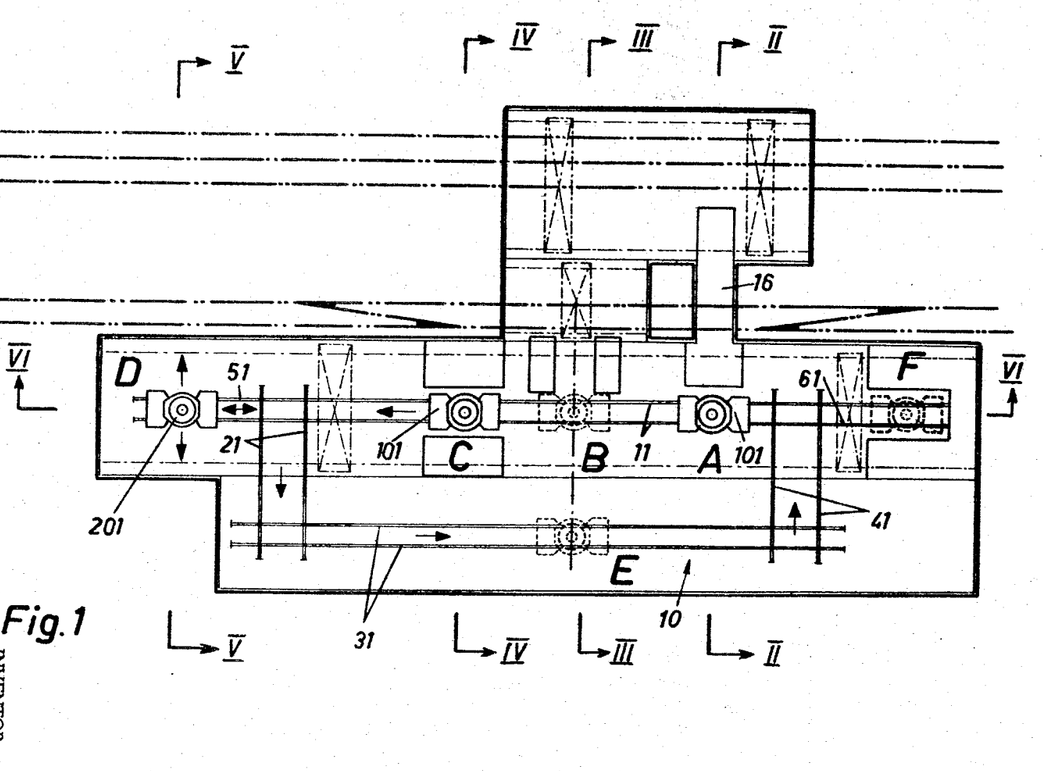
FIGURE 1 diagrammatically shows in plan view an oxygen-blow steelmaking plant according to the invention.
Figure 2:
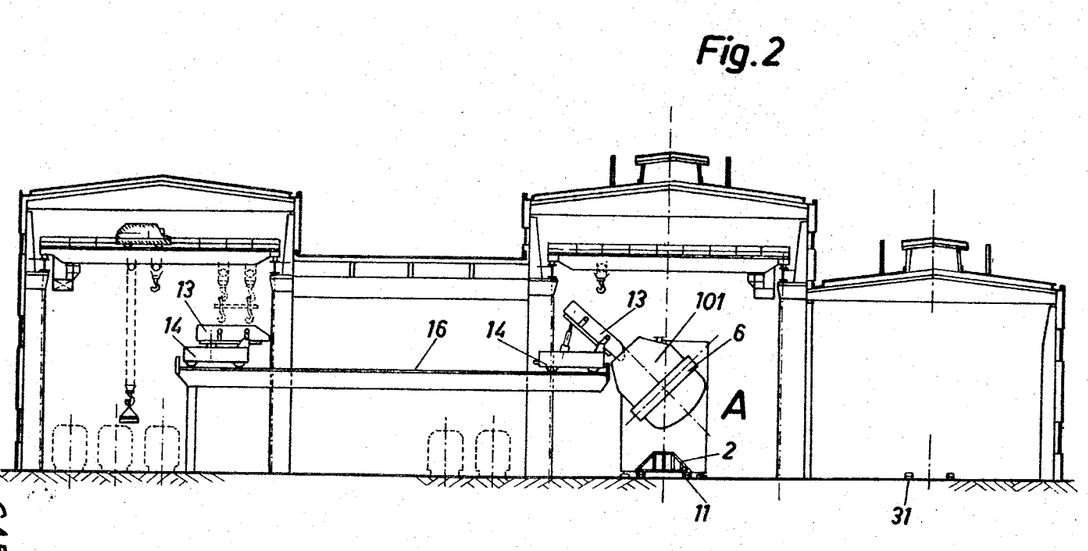
FIGURES 2, 3, 4, 5 and 6 are sections on lines II—II, III—III, IV—IV, V—V and VI—VI of FIGURE 1.
Figure 3:
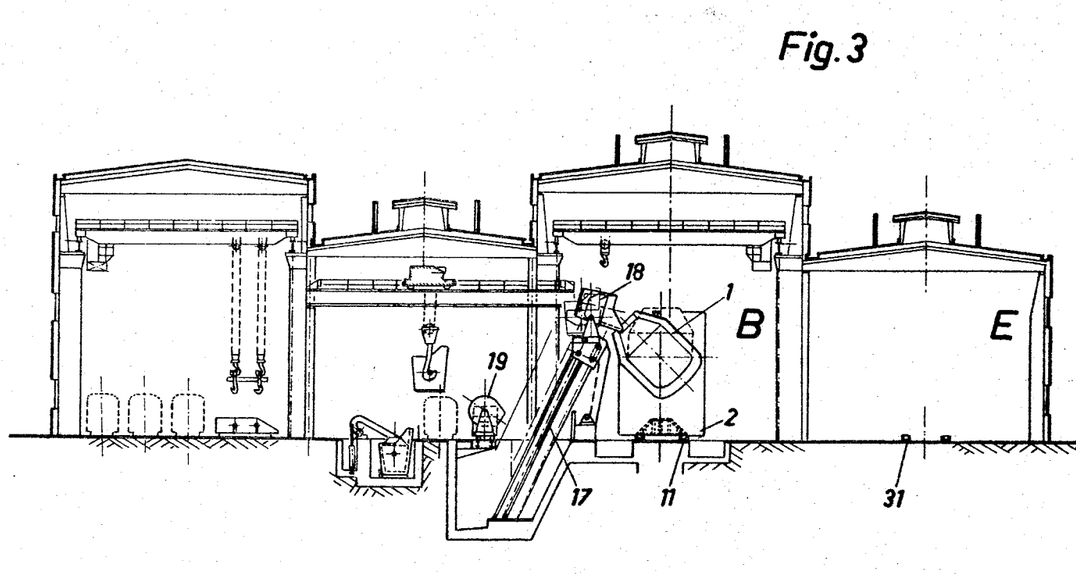
Figure 4:
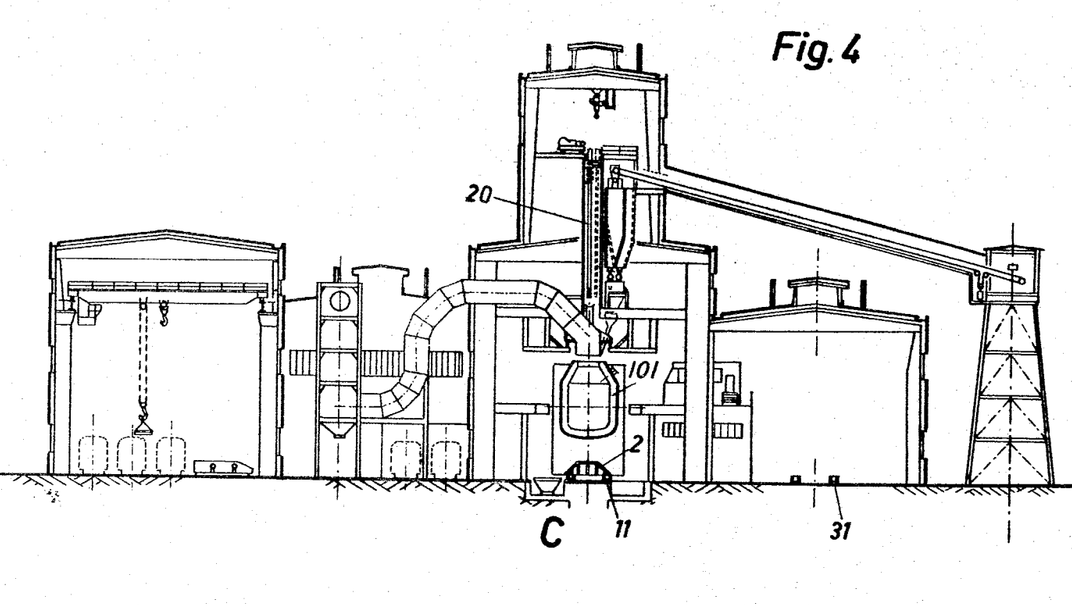
Figure 5:
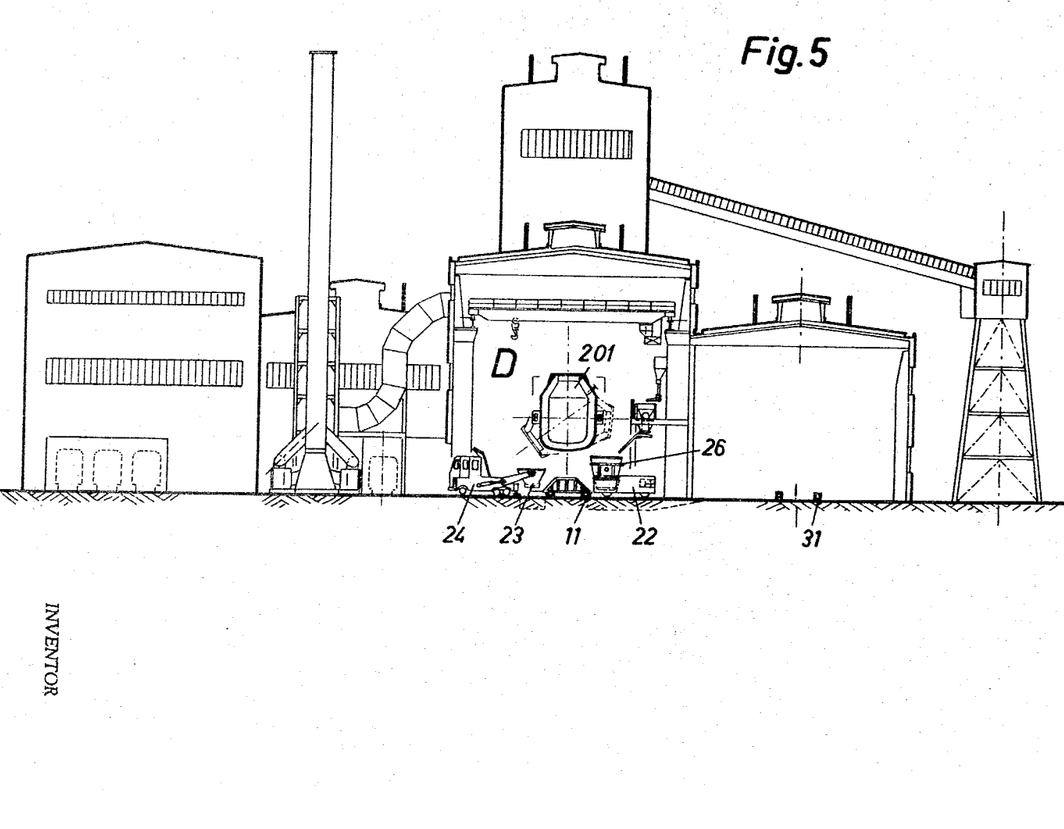
Figure 6:
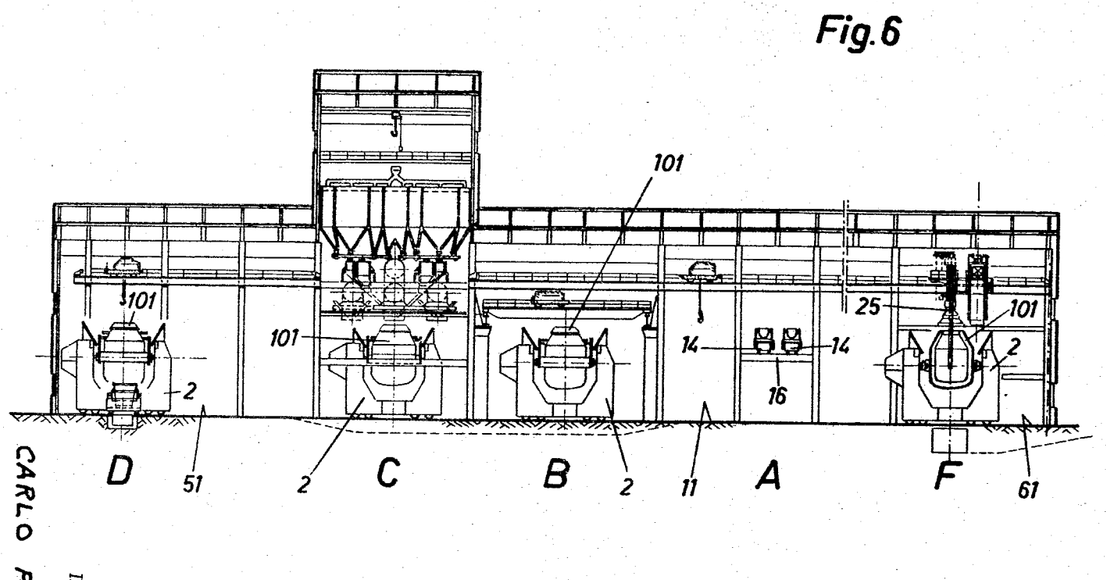

In the pneumatic steelmaking plant as shown, a track 1 is shown comprising a main longitudinal section 11, two shorter transverse sections 21, 41 and a longitudinal return section 31. These track sections form together a closed rectangular path and the main longitudinal section 11 presents the dead end extensions 51 and 61. A plurality of converters 101 are mounted upon trucks 2 which are adapted to travel along the track sections.

Figure 7:
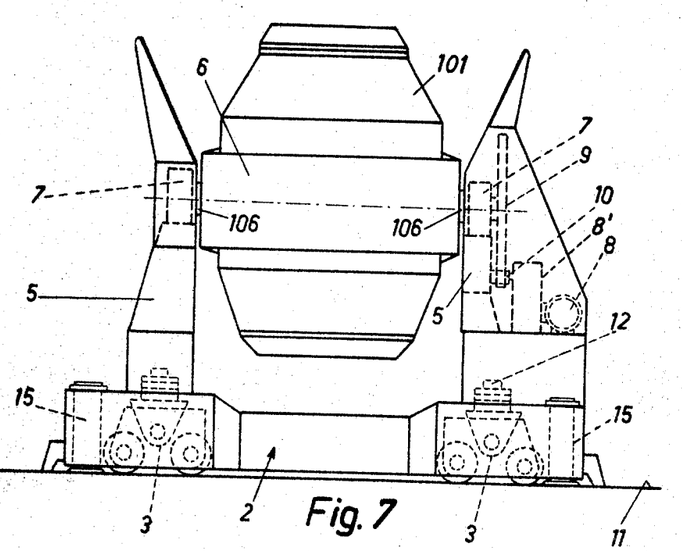
FIGURES 7 and 8 show in elevation and in plan view a travelling converter according to the invention.
Figure 8:
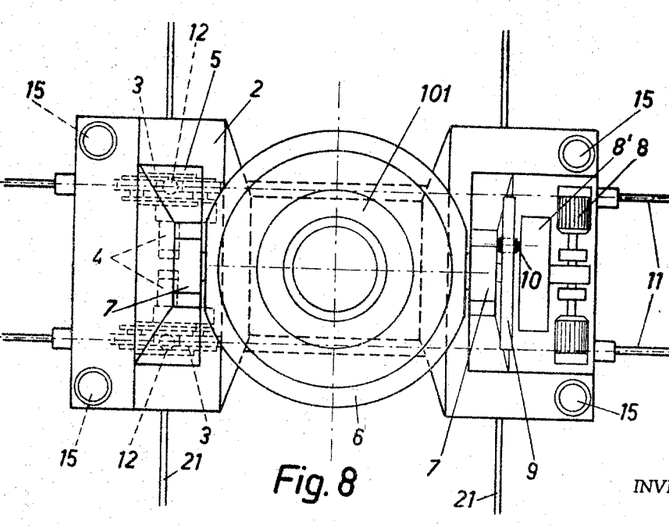

In the embodiment as shown in FIGURES 7 and 8, each truck 2 is provided with four bogies 3, each comprising preferably two wheels driven by an electric motor 4, through suitable reduction gearing. A pair of columns 5 are mounted on each truck and carry bearings 7 receiving the trunnions 106 of a tiltable ring 6 which mounts the converter 101. A converter-tilting unit comprises the motor 8, reduction gear unit 8' and a gear drive 9, 10 operatively connected to one of the trunnions 106.

The feeding of the converter electromotors may be effected by conventional sliding contacts.

The shunting of the converter from either track section to the adjoining one may be effected by mounting conventional shunting turntables (not shown) at the track crossings.

Instead of said turntables, in the embodiment as shown, however, truck 2 is provided at its four corners with hydraulic feet 15 which may be extended or retracted by means of hydraulic power means. In this embodiment, the bogies 3, together with their motors 4 are rotatably mounted on vertical pivots 12.

In operation, when the converter 1 is shifted along one of the straight track sections 51, 11, 61, 31, 21 and 41, the hydraulic feet 15 are retracted. When however the truck 2 should be shunted from either of the track sections to another section crossing same, the truck is stopped at the track crossing and its hydraulic feet 15 are extended until they lift wheels on which the converter is traveled, clear of the track. The wheel-carrying bogies 3 are then turned about their vertical pivots 12, until their wheels come to be in the direction of the track section to be travelled, whereafter the hydraulic feet 15 are retracted until the bogie wheels engage the desired track section.

In the embodiment as shown in FIGURE 1, three converters are shown, one of them as designated by the reference character 201 on the dead track extension 51, outside of the closed circuit formed by the track sections 11, 21, 31, 41 and the other two as designated by the reference character 101 on the track section 11, at stations A and C.

Starting from the dead end 61 of the track section 11 where there is the converter lining restoring station F, a converter is moved on track 11 until it reaches the station A, at which the charge of the solid scrap is effected. Then the converter is moved to station B, where the molten cast-iron charging takes place and then to the blowing station C, where the molten charge is refined to steel. When the refining is completed, the converter is wheeled to the steel- and slag- pouring station D. When the converter is empty, it is wheeled back until it comes in correspondence of the crossing of section 11 with section 21 and is wheeled along said last-named section 21 until it comes to the crossing of track section 21 with track section 31 from which it is transferred upon the longitudinal return track section 31, along which the converter cleaning station E is provided. Once the cleaning is effected, the converter 1 is shifted towards the crossing of section 31, with the transversal section 41 and after having traveled to the crossing of track section 41 with section 11, it is returned into the working cycle on section 11 and dead end 51. Whenever the lining of any one of the three converters is to be restored, the converter is shunted onto the track extension 61, where it may remain until the refractory lining is restored, without interferring with the operation of the other two (or more) converters.

At each station, when the converter is stopped, it may be steadied during the operation by extending the hydraulic feet 15 into contact with the ground.

The arrangements at the several stations are shown more in detail in FIGURES 2 through 6.

In station A (FIGURE 2) the converter is tilted and receives the solid scrap charge from an end tipper 13 mounted upon a carriage 14 provided with hydraulic tipping means. Usually two of such carriages 14 are provided to travel forth and back on the platform 16 between a scrap charge point and the point of discharge to the converter.

In station B (FIGURE 3) the molten cast-iron is charged into the tilted converter by tiltable ladle 18 which is lifted by means of an elevator 17. The ladle 18, in its turn, when it comes to be in its lower position on the elevator, receives the molten cast-iron from a container 19 tiltably mounted upon a truck.

After having received the molten cast-iron charge, the converter is shifted to the blowing station C (FIGURE 4) where the lance 20 for blowing oxygen, or air enriched with oxygen, is introduced into the converter and the metallurgical refining process is effected, including the introduction of the additions, and the sampling, when the blowing is completed.

In the station D (FIGURE 5) on the track section 51, the converter 201 is first tipped on one side and the steel is poured into ladle 26 carried by track 22 and then is tipped on the opposite side for pouring the slag into bin 23 mounted on a motor van 24.

Subsequently the converter 201 is returned on the crossing of tracks 11–21 and through the crossing of tracks 21–31 is shifted onto longitudinal track section 31 and is stopped in station E where the cleaning of the converter, the checking of its lining and the repair of the tap hole are effected.

If the refractory lining is still in good condition, the converter is returned to station A and the above-described cycle is repeated.

At station F (FIGURES 1 and 6) there are the conventional equipment and means for the quick cooling of the converters to be re-lined, for the breaking down of the old lining, for the construction of the new lining and for its quick drying and its preheating by means of a lance 25 through which air and fuel may be blown into the re-lined converter, in which coke has been previously introduced, as usual.

From the foregoing it is apparent that by suitably choosing the number of the travelling converts, the operation of the blowing station C may be practically continuous, and while one of the converters is at the blowing station C, another converter may be at one of the preceding stations A or B, while a third converter may be at the following stations D or E.

Of course, instead of three converters, as shown, also four and even more converters may be employed in a single steelmaking plant, particularly whenever it is desired to employ the very hot carbon monoxide containing gases evolved during the blowing for preheating the scrap charges or for other purposes.

Figure 12:
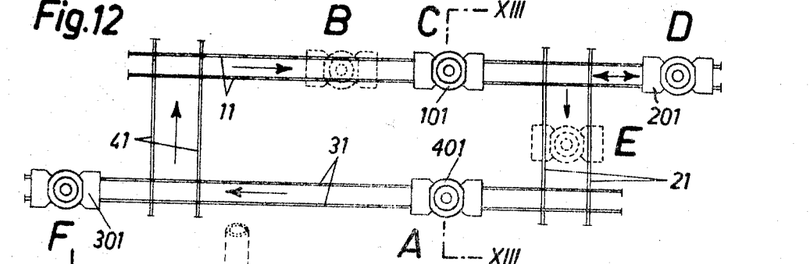
FIGURE 12 shows diagrammatically in plan view a variation of embodiment of the steelmaking plant according to the main patent.

This is diagrammatically shown in FIGURE 12, where the plant is assumed to be provided with four like converters 101, 201, 301 and 401.

Figure 13:
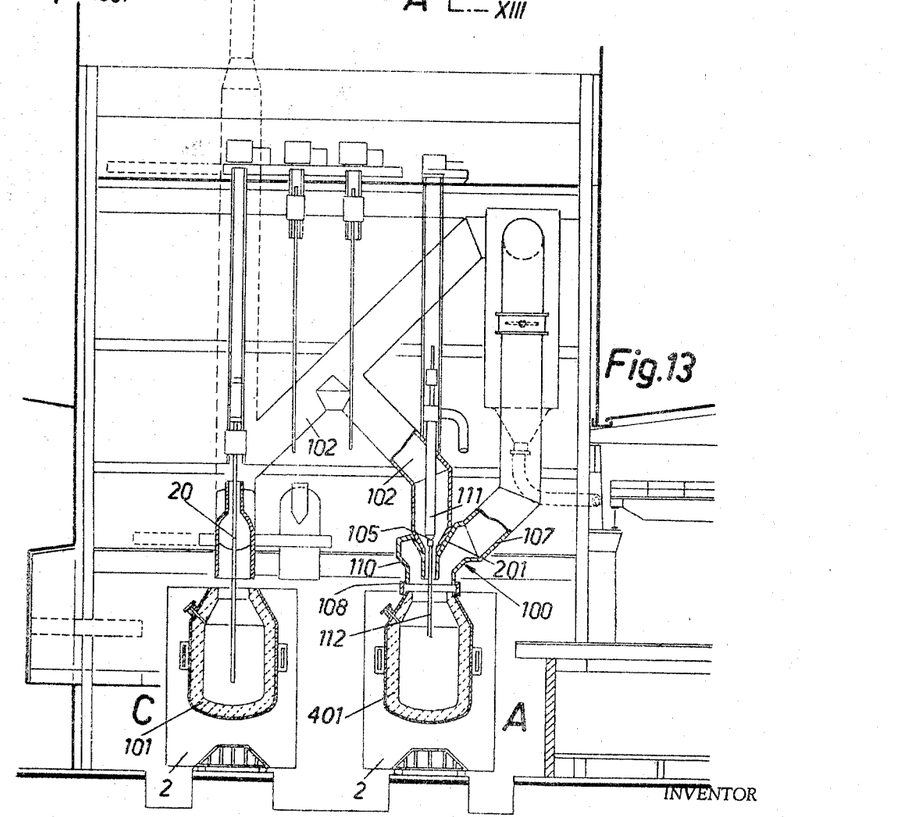
FIGURE 13 is a vertical section on line XIII—XIII of FIGURE 12.

As may be seen from FIGURE 12, the scrap-charging station A is provided preferably on track section 31 in front of the blowing station C on track section 11. This arrangement places the converter 401 at the scrap-charging station in close proximity and converter 101 at the blowing station, as shown in FIGURE 13.

Figure 9:
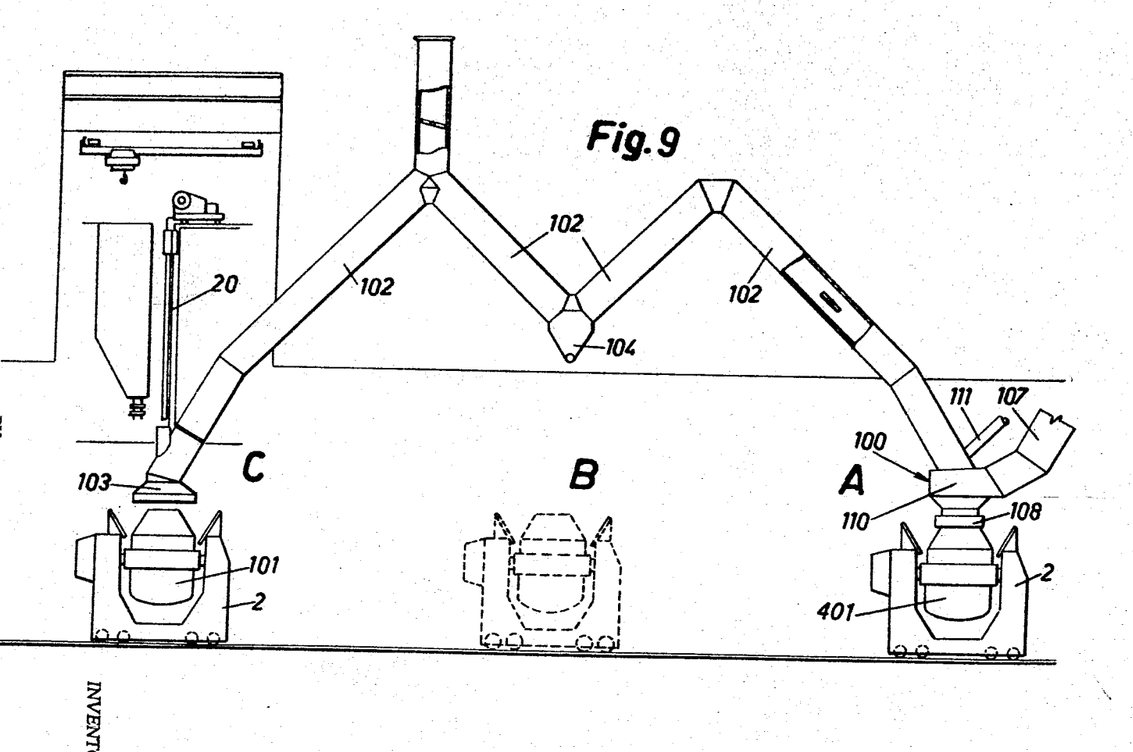
FIGURE 9 shows in elevation a part of the steelmaking plant according to the main patent, said part comprising the solid scrap charging station and the blowing station.
Figures 10, 11:
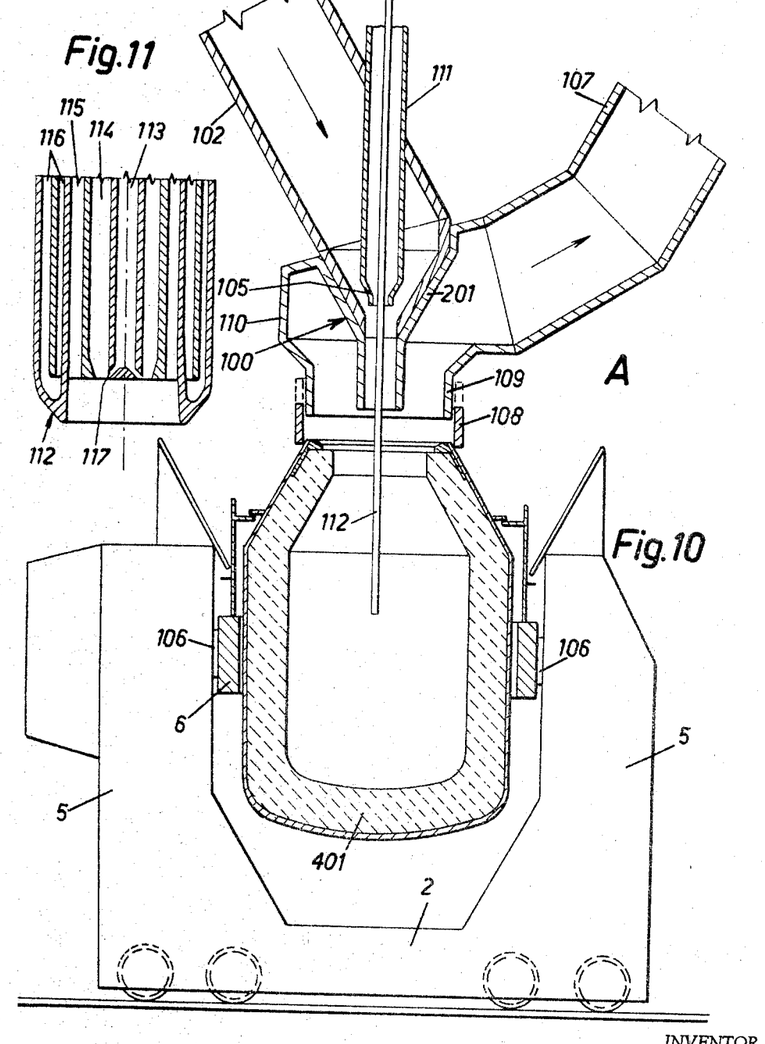
FIGURE 10 shows in a larger scale and in elevation with parts in section, a converter at the solid scrap charging station, during the preheating of said scrap charge.
FIGURE 11 shows in vertical section, at a larger scale, a detail of FIGURE 10.

In the embodiment as shown in FIGURES 9 to 11, when the preheating of the solid scrap charge is effected in converter 401 at the said charging station A, on track section 31, a burner 100 (FIGURE 10) is provided. This burner 100 registers with the converter and comprises a funnel-shaped section 201 connected by means of a conduit 102 to the collecting hood 103, FIGURE 9, above the converter 101 at the blowing station C. This hood 103 is designed for collecting the CO-rich, very hot gases which are evolved during the blowing and leading same to said burner nozzle 100.

Co-axially of burner nozzle 201 a propelling jet nozzle 105 is mounted, which is connected to oxygen or oxygen-enriched air feed conduit 111, which constitutes together with the burner nozzle 201 a jet pump in which the propelling jet nozzle 105 sucks through piping 102 the combustible gases evolved at station C.

All around the burner nozzle 201 and co-axially thereto a hood 110 is provided, which is provided with a vertically-slidable sleeve member 108 which may be lowered or lifted in a vertical direction, along a lower extension 109 of said hood 110, in order to bring the lower sleeve edge into or out of contact with the converter mouth, thus establishing the communication between the converter at station A and an outlet conduit 107 (FIGURE 9).

In operation, when the collar 108 is lifted, the converter may travel to the scrap-charging station A, where it is tilted and where it receives the solid scrap charge, whereafter the converter 1 is again erected and sleeve 108 is lowered upon the converter mouth, whose interior is thus put into communication with hood 110 and consequently with the outlet 107, as shown in FIGURE 10.

At the same time the converter 101 is wheeled to the blowing station C and into it oxygen is blown through lance 20. The resulting CO-rich gas evolved by said blowing, is sucked by means of jet pump 111–201 through conduit 102 and is blown into the converter 1 at station A, where it is mixed with the oxygen from nozzle 105 and burns within the converter 1. Thus the preheating of the solid scrap charge fed into the converter 1 at the scrap-feeding station A is effected. For this scrap preheating, also the sensible heat of the converter gases (whose temperature is in the range of 1000 to 1500° C.) at the blowing station C may be utilized. The combustion gases from converter at station A are discharged through hood 110 into conduit 107 and are conveyed therefrom to a conventional cooling and purifying apparatus (not shown). At the end of the blowing at the station C, when the burner 100 is extinguished, sleeve 108 is lifted and the converter moved to station B, where it receives the liquid cast-iron charges, and thereafter to blowing station C.

Whenever the gas which is evolved during the blowing at the station C is not employed for preheating, it may be employed otherwise or led to a conventional open nozzle (for burning in the open air) or to a gasometer.

At the pre-heating station A a lance 112 may also be introduced into the converter 1 for burning in said converter 1 any additional gaseous or liquid fuel.

FIGURE 11 shows in section the lower end of a type of lance 112 employed in the arrangement shown in FIGURE 10. This lance 112 comprises a central axial duct 113 for the fuel oil and which is provided at its lower end with bores or nozzle 117. All around said duct 113 for the fuel oil, a co-axial annular duct 114 is provided for the oxygen. The annular co-axial duct 114 for the oxygen is surrounded in its turn by another co-axial annular duct 115 for any other suitable fuel gas. The outer wall of the lance 112 is provided with a jacket 116 in which the cooling water circulates.

As may be seen from the embodiment as shown in FIGURES 12 and 13, by arranging the blowing station C in front of the scrap-charging station A, the length of the conduit 102 connecting the converters 1 and 101 at said two stations is greatly reduced and thus the sensible heat losses of said gas are also reduced.

Furthermore, as may be seen from FIGURE 9, said conduit may be made of inclined section for collecting solid matter for delivery to a central outlet pot 104 of conventional construction.

Of course, the invention is not limited to the embodiment as just described and shown, but may be widely varied and modified without departing from the basic principle as set out above and as claimed hereinafter.

I claim:
1. In a steelmaking plant, in combination,
   a plurality of converters adapted to be moved in a continuous path along which stations are arranged, one station being a blowing station and another station being a preheating station, one converter being at the blowing station and a second converter being at said preheating station,
   lance means for introducing oxygen-rich gas into said one converter to evolve carbon monoxide,
   a hood fixed in spaced relation above said one converter for collecting said carbon monoxide,
   a conical mouthpiece fixed in spaced relation above said second converter and discharging downwardly thereto,
   conduit means connecting said hood to said mouthpiece,
   a nozzle arranged coaxially in said mouthpiece into said second converter, said nozzle being connected to an oxygen-rich gas supply for discharging of oxygen-rich gas from said nozzle through said mouthpiece and thereby pumping carbon monoxide from said hood into said second converter.

2. In the steelmaking plant according to claim 1 including a second hood surrounding said mouthpiece for collecting gas from said second converter, said second hood being disposed in fixed relation above said second converter, and a vertically movable collar surrounding said second hood for raising and lowering movement relative to said second converter.

3. In the steelmaking plant according to claim 1 including second lance means projecting through said jet nozzle into said second converter for introducing fuel thereinto.

References Cited

UNITED STATES PATENTS

| | | | |
|---|---|---|---|
| 405,491 | 6/1889 | Lindenthal | 266—13 |
| 3,219,439 | 11/1965 | Longenecker | 75—60 |
| 3,312,544 | 4/1967 | McCready et al. | 266—13 XR |
| 3,205,810 | 9/1965 | Rosenak | 266—35 X |
| 3,301,664 | 1/1967 | Hall | 75—60 |

FOREIGN PATENTS

| | | |
|---|---|---|
| 1,395,645 | 3/1965 | France. |
| 563,406 | 11/1932 | Germany. |
| 1,100,594 | 4/1955 | France. |
| 1,176,683 | 8/1964 | Germany. |

J. SPENCER OVERHOLSER, *Primary Examiner.*

R. SPENCER ANNEAR, *Assistant Examiner.*

U.S. Cl. X.R.

75—60; 266—35